(12) United States Patent
Dounaev et al.

(10) Patent No.: US 7,684,496 B2
(45) Date of Patent: Mar. 23, 2010

(54) METHODS AND SYSTEMS FOR DIGITAL DATA TRANSMISSION

(76) Inventors: Igor Borisovich Dounaev, Ul. Gogolya 15a-48, Khimki, Moscow district (RU) 141400; Leonid Alexeevich Letounov, MZhK Solnechnyi 2-105, Gomel (BY) 246050

( * ) Notice: Subject to any disclaimer, the term of this patent is extended or adjusted under 35 U.S.C. 154(b) by 905 days.

(21) Appl. No.: 10/983,473

(22) Filed: Nov. 5, 2004

(65) Prior Publication Data
US 2005/0078597 A1  Apr. 14, 2005

Related U.S. Application Data

(63) Continuation of application No. PCT/RU02/00101, filed on Mar. 20, 2002.

(51) Int. Cl.
*H04B 14/04* (2006.01)
(52) U.S. Cl. .................. 375/242; 370/204; 375/243
(58) Field of Classification Search .............. 375/242, 375/222, 243, 231; 370/204
See application file for complete search history.

(56) References Cited

U.S. PATENT DOCUMENTS

| | | | | |
|---|---|---|---|---|
| 4,107,669 | A * | 8/1978 | Tewksbury | 341/143 |
| 4,334,237 | A * | 6/1982 | Reitmeier et al. | 348/619 |
| 4,348,768 | A * | 9/1982 | Svala | 375/243 |
| 5,334,977 | A * | 8/1994 | Kato | 341/76 |
| 5,528,625 | A * | 6/1996 | Ayanoglu et al. | 375/222 |
| 5,796,731 | A * | 8/1998 | Mellado et al. | 370/362 |
| 6,052,412 | A * | 4/2000 | Ruether et al. | 375/231 |
| 6,201,842 | B1 * | 3/2001 | Kim | 375/346 |
| 6,606,355 | B1 * | 8/2003 | Wei | 375/242 |

(Continued)

FOREIGN PATENT DOCUMENTS

EP  0503528 A2  9/1992

(Continued)

OTHER PUBLICATIONS

Bellamy ("Digital Telephony", John Wiley & Sons, Inc. 1982, Chapter 3.2.4 pp. 98-99).*

(Continued)

*Primary Examiner*—David C. Payne
*Assistant Examiner*—Leon-Viet Q Nguyen
(74) *Attorney, Agent, or Firm*—Houston Eliseeva LLP

(57) ABSTRACT

Methods and systems for transmitting a discrete information over a communication path comprising analogue communication lines and a pulse-code modulation (PCM) channel are considered, which methods and systems allow to increase the data transfer rate over the entire path up to the data transfer rate in the PCM channel irrespective of the quality of analogue communication lines really employed. In this case, the spectrum of signal being transmitted over the analogue communication line is selected such that the information transfer rate over this analogue communication line is equal to the information transfer rate over the PCM channel, and the number of quantization levels for samples being transmitted over the analogue communication line is the least possible for this analogue communication line. During the conversion of the analogue signal into the PCM channel signal, the sampling rate of this signal is decreased in proportion to the ratio of the number of quantization levels for samples being transmitted over the PCM channel to the number of quantization levels for samples being transmitted over the analogue communication line.

14 Claims, 4 Drawing Sheets

U.S. PATENT DOCUMENTS

2003/0156632 A1\* 8/2003 Dowling .................. 375/222
2004/0125878 A1\* 7/2004 Liljeryd et al. ............ 375/242

FOREIGN PATENT DOCUMENTS

| RU | 2172565 C2 | 4/2000 |
| --- | --- | --- |
| WO | 99/40685 A2 | 8/1999 |
| WO | 01/99364 A1 | 12/2001 |
| WO | 01/99365 A1 | 12/2001 |

OTHER PUBLICATIONS

International Search Report, mailed Oct. 31, 2002, from International Application No. PCT/RU2002/000101, filed Mar. 20, 2002.

Translation of International Preliminary Examination Report, dated Oct. 8, 2003, from International Application No. PCT/RU2002/000101, filed Mar. 20, 2002.

\* cited by examiner

US 7,684,496 B2

METHODS AND SYSTEMS FOR DIGITAL DATA TRANSMISSION

FIELD OF THE INVENTION

This invention relates to methods and systems for transmitting a discrete information, and particularly to methods and systems for transmitting information over paths that include pulse-code modulation channels and analogue lines.

BACKGROUND OF THE INVENTION

At present, a serious problem is in increasing an information transfer rate over paths consisting of lines having different nature. Generally, an information transfer path consists of pulse-code modulation (PCM) channel coupling automatic exchanges which are connected to modems of analogue line end users. Such an analogue (telephone, as a rule) line has been referred to specifically as the "last mile".

Usual PCM channel has a bandwidth of 4 kHz and can transfer a 8-bit signal, which is equivalent to the transmission rate of 64 kbit/sec. An analogue line of the "last mile" transmits a signal occupied a bandwidth not more than 3.1 kHz and ensures, depending on the employed modulation type, a transmission rate of 300 to 14400 bit/sec at signal-to-noise ratio of 20 to 25 dB.

The relation between the rate C of information transmission over a communication line (channel), the bandwidth $\pi$ of the communication line (channel), the power $P_C$ of a signal being transmitted, and the power $P_\pi$ of interference in the communication line (channel) is defined by the Shannon equation:

$$C = \Pi \cdot \log_2 \frac{P_C + P_\Pi}{P_\Pi} \quad (1)$$

For the analogue line having the bandwidth $\pi=4$ kHz and the ratio of signal power $P_C$ to the interference power $P_\pi$ (the signal-to-noise ratio) of 42 dB, the information transfer rate C=55.9 kbit/sec. This relation is deduced for the ideal case, and in practice a reserve is necessary of 7 to 8 dB, i.e., the signal-to-noise ratio will be approximately 50 dB. However, real analogue lines have the signal-to-noise ratio about 10 to 20 dB, which gives, according to the Equation (1), the rate C=15-30 kbit/sec.

Known are the method and system for duplex transmitting a discrete information over the PCM channel, which method and system ensure the data transmission from the PCM channel to the end user modem at the rate of 56 kbit/sec, but the data rate in the opposite direction in this method does not exceed 33.6 kbit/sec [Э.Б. Минкин (E. B. Minkin). <<АнатомияМОДЕМНЫХ<<56K- технологий>> (Anatomy of modem "56K-technologies")//Cemu u cucmeмы сеязu(*Communication networks and systems*). 1997, No. 8, pp. 54-61, and No. 9, pp. 78-87 (in Russian)].

Disadvantage of the indicated prior art is in impossibility to increase the transfer path capacity due to the fact that the bandwidth of analogue line is generally chosen equal to the bandwidth of PCM channel, i.e., 4 kHz.

The closest analogue is the method for duplex transmitting a discrete information over a communication path comprising a bidirectional PCM channel, each end of which turns into a respective bidirectional analogue communication line, the method including steps of: converting samples of discrete signal to be transmitted to the form suitable for transmitting over a bidirectional analogue communication line; transmitting the converted signal samples over the analogue communication line to the PCM channel; converting a signal received from the analogue communication line into a PCM channel signal; transmitting the PCM channel signal over said PCM channel; performing the inverse conversion of channel signals after their passing over the PCM channel; transmitting the converted channel signals over another bidirectional analogue communication line; picking out the signals transmitted over the another bidirectional analogue communication line; and converting those signals into discrete samples [WO 01/99364, H 04 L 27/26, 27.12.2001].

The method for duplex transmitting over a single path could be imagined as an independent transmission of signals in opposite directions over two virtual paths. Then, the same document [WO 01/99364 A1] could be considered as disclosing the known method for transmitting a discrete information over a communication path comprising, in the direction of signal transmission, at least an analogue communication line and a PCM channel, the method including steps of: converting samples of discrete signal to be transmitted to the form suitable for transmitting over an analogue communication line; transmitting the converted signal samples over the analogue communication line to the PCM channel; converting a signal received from the analogue communication line into a PCM channel signal; transmitting the PCM channel signal over said PCM channel.

The method for duplex transmitting is realized using the system for duplex transmitting a discrete information, the system comprising: a first modem, a first bidirectional analogue communication line, a first converter, a bidirectional PCM channel, a second converter, a second bidirectional analogue communication line, and a second modem, all coupled in series [WO 01/99364 A1].

The method for transmitting a discrete information over a communication path comprising, in the direction of signal transmission, at least an analogue communication line and a PCM channel, could be realized using the system for transmitting a discrete information, the system comprising a modulator, an analogue communication line, a direct converter, and a PCM channel [WO 01/99364 A1].

The indicated document, as well as the co-pending PCT Application WO 01/99365 describe the method and system for transmitting a discrete information to be used in networks with data transfer rates of 64 kbit/sec at the signal-to-noise ratio 10 dB in a telephone line when transmitting from a subscriber to a PCM equipment. However, the analysis of both those PCT Applications reveals that, in order to realize the indicated data transfer rate, the conversion of information signal into eight low-frequency channels is used, each of which channels occupies a bandwidth of 0 to 4 kHz, the bandwidth of all eight channels being spread onto different frequencies to make, as a result, all channels to occupy a bandwidth of 32 kHz. In practice, due to a necessity of providing a required isolation between channels, the total bandwidth of all eight channels will be larger than 32 kHz; otherwise, it will have to reduce a bandwidth occupied by each channel, which leads to distortions of transmitted signal.

SUMMARY OF THE INVENTION

The object of the present invention is in developing such methods and systems for transmitting a discrete information, which would allow to obtain the technical result being in a real increase of the data transfer rate over the entire path up to the data transfer rate in the PCM channel irrespective of a quality of really employed analogue communication lines.

This technical result is achieved in a method for transmitting a discrete information over a communication path comprising at least an analogue communication line and a pulse-code modulation (PCM) channel in the direction of the signal propagation, the method including steps of: converting samples of a discrete signal to be transmitted into the form suitable for transmitting over the analogue communication line; transmitting the converted signal samples over the analogue communication line to the PCM channel; converting the signal received from the analogue communication line into a PCM channel signal; transmitting the PCM channel signal over said PCM channel,—owing to that, in accordance with the first aspect of the present invention, the method includes a step of: selecting a spectrum of the signal being transmitted over the analogue communication line such that the information transfer rate over said analogue communication line is equal to the information transfer rate over the PCM channel, and the number of quantization levels for samples being transmitted over the analogue communication line is the least possible for this analogue communication line; and, in the step of converting the signal received from the analogue communication line into a PCM channel signal, decreasing the sampling rate of this signal in proportion to the ratio of the number of quantization levels for samples being transmitted over the PCM channel to the number of quantization levels for samples being transmitted over the analogue communication line.

An additional feature of this method is in that, given another analogue communication line after the PCM channel in the communication path in the direction of the signal propagation, performing an inverse conversion of the channel signals after their passing over the PCM channel, which conversion is in decreasing the number of quantization levels for samples from the PCM channel to the least possible for this analogue communication line, and in increasing proportionally the sampling rate in order to make the information transfer rate over said another analogue communication line equal to the information transfer rate over the PCM channel.

Particularly, for the PCM channel having the information transfer rate of 64 kbit/sec and the transmission bandwidth of 4 kHz, the spectrum of the signal being transmitted over any analogue communication line is selected equal to 32 kHz, and the number of quantization levels for samples being transmitted over this analogue communication line is selected as two.

The same technical result is achieved in a system for transmitting a discrete information, the system comprising a modulator, analogue communication line, forward converter, and pulse-code modulation (PCM) channel, all coupled in series,—owing to that, in accordance with the second aspect of the present invention, the spectrum of the signal being transmitted over the analogue communication line is selected such that the information transfer rate over said analogue communication line is equal to the information transfer rate over the PCM channel; the modulator ensures, in the analogue communication line, the carrier modulation having for this analogue communication line the least possible number of quantization levels for samples being transmitted over this analogue communication line; and the forward converter ensures the conversion of the signal received from the analogue communication line into the PCM channel signal with decreasing the sampling rate of this signal in proportion to the ratio of the number of quantization levels for samples being transmitted over the PCM channel to the number of quantization levels for samples being transmitted over the analogue communication line.

An additional feature of this system is in that an inverse converter, another analogue communication line, and demodulator, all coupled in series, could be connected to the PCM channel output, the inverse converter ensuring the step of decreasing the number of quantization levels for samples from the PCM channel to the least possible for this analogue communication line, and increasing proportionally the sampling rate in order to make the information transfer rate over said another analogue communication line equal to the information transfer rate over the PCM channel, and the demodulator ensuring a step of demodulating signals transmitted over said another analogue communication line into the discrete samples.

Particularly, for the PCM channel having the information transfer rate of 64 kbit/sec and the transmission bandwidth of 4 kHz, the spectrum of the signal being transmitted over any analogue communication line is 32 kHz, and the number of quantization levels for samples being transmitted over this analogue communication line is two.

The same technical result is achieved in a method for duplex transmitting a discrete information over a communication path comprising a bidirectional PCM channel, each end of which turns into a respective bidirectional analogue communication line, the method including steps of: converting samples of discrete signal to be transmitted to the form suitable for transmitting over a bidirectional analogue communication line; transmitting the converted signal samples over the analogue communication line to the PCM channel; converting a signal received from the analogue communication line into a PCM channel signal; transmitting the PCM channel signal over said PCM channel; performing the inverse conversion of channel signals after their passing over the PCM channel; transmitting the converted channel signals over another bidirectional analogue communication line; picking out the signals transmitted over the another bidirectional analogue communication line; and converting those signals into discrete samples,—owing to that, in accordance with the third aspect of the present invention, the method includes a step of: selecting a spectrum of the signal being transmitted over each bidirectional analogue communication line such that the information transfer rate over said bidirectional analogue communication line is equal to the information transfer rate over the PCM channel, and the number of quantization levels for samples being transmitted over the bidirectional analogue communication line is the least possible for this bidirectional analogue communication line; in the step of converting the signal received from the bidirectional analogue communication line into a PCM channel signal, decreasing the sampling rate of this signal in proportion to the ratio of the number of quantization levels for samples being transmitted over the PCM channel to the number of quantization levels for samples being transmitted over the bidirectional analogue communication line; and, in the step of converting the channel signal received from the PCM channel into the signal for the bidirectional analogue communication line, performing the same in magnitude increase of the sampling rate of this signal.

Particularly, for the bidirectional PCM channel having the information transfer rate of 64 kbit/sec and the transmission bandwidth of 4 kHz, the spectrum of the signal being transmitted over any bidirectional analogue communication line is selected equal to 32 kHz, and the number of quantization levels for samples being transmitted over this bidirectional analogue communication line is selected as two.

The same technical result is achieved in a system for duplex transmitting a discrete information, the system comprising: a first modem, first bidirectional analogue communication line, first converter, bidirectional pulse-code modulation (PCM) channel, second converter, second bidirectional analogue communication line, and second modem, all coupled in series,—owing to that, in accordance with the forth aspect of the present invention, the spectrum of the signal being transmitted over each bidirectional analogue communication line is selected such that the information transfer rate over said bidirectional analogue communication line is equal to the information transfer rate over the bidirectional PCM channel; each modem ensures, in the bidirectional analogue communication line, the carrier modulation having for this bidirectional analogue communication line the least possible number of quantization levels for samples being transmitted over this bidirectional analogue communication line, and ensures a demodulation of signals transmitted over said bidirectional analogue communication line into discrete samples; each converter ensures a conversion of signal received from the bidirectional analogue communication line into a PCM channel signal with decreasing the sampling rate of this signal in proportion to the ratio of the number of quantization levels for samples being transmitted over the PCM channel to the number of quantization levels for samples being transmitted over the bidirectional analogue communication line, and ensures a decrease of the number of quantization levels for samples from the PCM channel to the least possible number for the bidirectional analogue communication line and a proportional increase of the sampling rate in order to make the information transfer rate over said bidirectional analogue communication line equal to the information transfer rate over the PCM channel.

Particularly, for the bidirectional PCM channel having the information transfer rate of 64 kbit/sec and the transmission bandwidth of 4 kHz, the spectrum of the signal being transmitted over any bidirectional analogue communication line is 32 kHz, and the number of quantization levels for samples being transmitted over this bidirectional analogue communication line is two.

An additional feature of this system is in that each of the first and second converters comprises a unit of forward conversion into PCM, unit of inverse conversion from PCM, and differential unit which combined input-output serves for receiving signals from the bidirectional analogue communication line and for transmitting signal to the bidirectional analogue communication line, a separate output of the differential unit is connected to an input of the unit of forward conversion into PCM which output serves for transmitting the PCM channel signal to the bidirectional PCM channel, and a separate input of the differential unit is connected to an output of the unit of inverse conversion from PCM, which input serves for receiving the PCM channel signal from the bidirectional PCM channel.

Yet an additional feature of this system is in that the unit of forward conversion into PCM is made in the form of shift register intended for sequential writing binary samples from the bidirectional analogue communication line with the sampling rate of this bidirectional analogue communication line, and for parallel reading the content of this shift register with the sampling rate of the PCM channel, and the unit of inverse conversion from PCM is made in the form of a shift register intended for parallel writing samples of the PCM channel signal with the sampling rate of the PCM channel, and for sequential reading binary samples from this shift register with the sampling rate of the bidirectional analogue communication line.

BRIEF DESCRIPTION OF DRAWINGS

In the accompanying drawings, the same elements are marked by the same reference numbers.

DETAILED DESCRIPTION OF THE INVENTION

Figure 1:
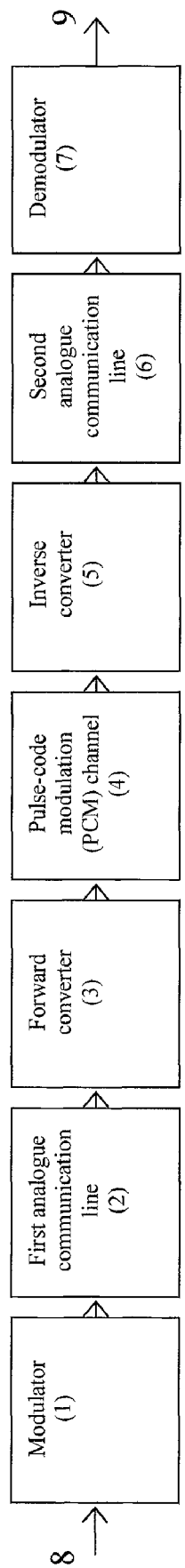
FIG. 1 illustrates the general diagram of the communication path including the PCN channel and analogue communication lines according to the present invention.

FIG. 1 shows the block diagram of conventional communication path including a modulator 1, first analogue communication line 2, forward converter 3, pulse-code modulation (PCM) channel 4, inverse converter 5, second analogue communication line 6, and demodulator 7. Any known or developed modems allowing to perform both the conversion of discrete signals into signals suitable for transmitting over an analogue communication line, and the inverse conversion could be used as the modulator 1 and demodulator 7. Examples of such modems could be taken from the aforementioned article by E. B. Minkin. The first and second analogue lines 2 and 6 are, e.g., conventional telephone lines (whether wired or optical fiber), as well as any other communication lines suitable for transmitting analogue signals. Their examples could be taken from the book by О. М. Денисьева, Д.Г.Мирошников(O. M. Denisieva, D. G. Miroshnikov). <<Средства связи для последней мили>> (Communication means for the last mile). —Москва: Эко—Трендз—НТЦНАТЕКС(Moscow: Eko-Trends-NTC NATEX, 1999, pp. 21-29 (in Russian). The forward converter 3 and inverse converter 5 are described in details below. Their purpose is to convert, respectively, the analogue signals from the communication line 2 into the PCM channel signal and backwards. The PCM channel 4 is a standard equipment for transmitting the pulse-code-modulated signals. An example of PCM channel could be taken from the aforementioned article by E. B. Minkin.

The discrete signal 8 to be transmitted comes to the input of the modulator 1. An example of such a discrete signal is a digital data received from the computer, e.g., an e-mail message. The discrete signal 9 is provided from the output of the demodulator 7, which signal is the copy of the signal come to the input of the modulator 1. Particular conversions of signals 8 into signals 9, which are standard, are described in the aforementioned article by E. B. Minkin, so their detailed description does not cited here.

The path shown in the FIG. 1 could be shortened in the case, where the digital signal from the output of the PCM channel 4 is directly provided to a consumer passing by the second analogue communication line 6. In this case, units 5 to 7 should be excluded from the diagram in FIG. 1.

Figure 2:
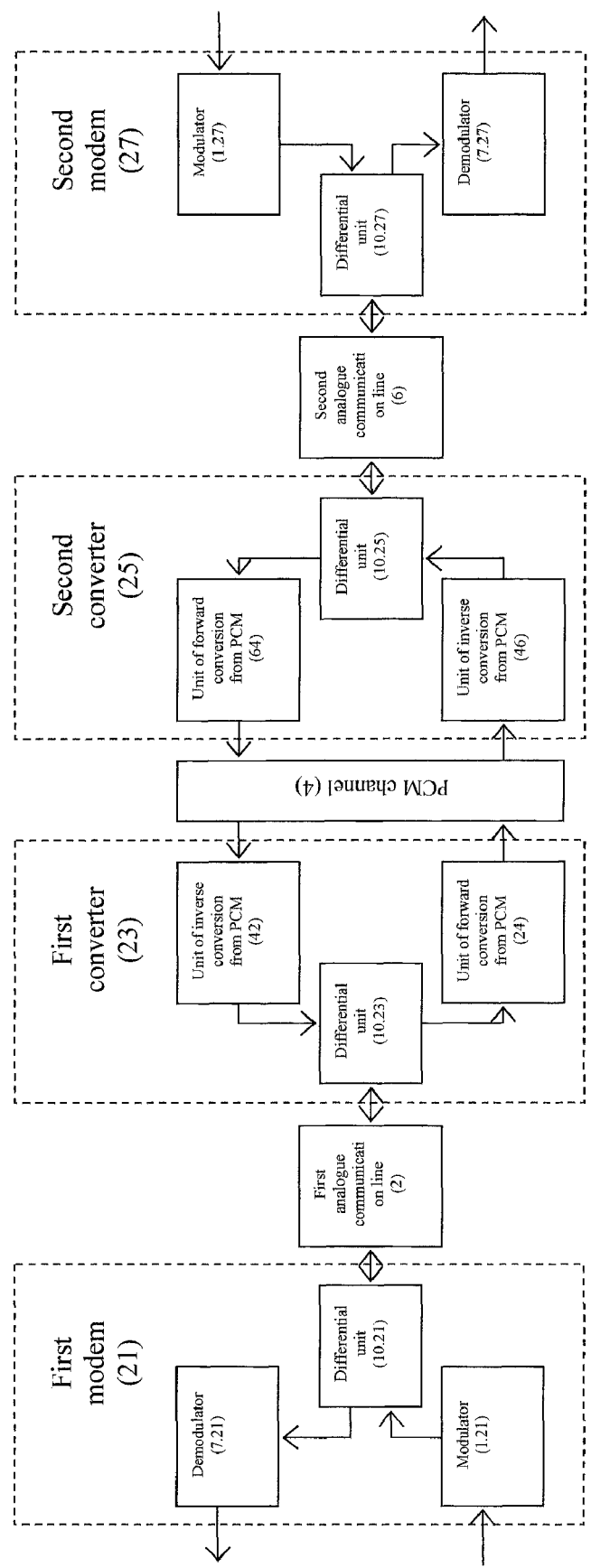
FIG. 2 represents the general diagram of the duplex communication path including the PCM channel and analogue communication lines according to the present invention.

FIG. 2 shows the general block diagram of duplex communication path including partially the same components as in the block diagram in FIG. 1, but in this case some of these components have more complicated embodiment described below. New elements in comparison with the FIG. 1 in this duplex communication path are the first modem 21 and second modem 27 inserted into the place of former modulator 1 and demodulator 7, respectively, as well as the first converter 23 and second converter 25 inserted into the path between the corresponding analogue communication lines 2 and 6 and the PCM channel 4 instead of forward converter 3 and inverse converter 5 in FIG. 1.

Each of the first and second modems 21, 27 and each of the first and second converters 23, 25 comprises the differential unit 10. The purpose of this unit 10 is to separate signals of forward and backward channels, which signals being transmitted over an analogue communication line (2 or 6). The input-output of the differential unit 10 is connected to the corresponding end of an analogue communication line (2 or 6). Generally, the transmission of signals over the same line in opposite directions is carried out by spacing these signals by frequency so that the spectrum of one of signals being transmitted over this communication line does not overlap the spectrum of signal being transmitted over the same communication line in the reverse direction. Correspondingly, the differential units 10 perform the required frequency shift of signals being transmitted. Examples of differential units could be taken from the aforementioned book by O. M. Denisieva and D. G. Miroshnikov.

Besides the differential unit 10, each modem 21 or 27 comprises the modulator 1 and demodulator 7. The modulator 1, as in the diagram in FIG. 1, is intended for converting samples of coming discrete signal 8 into corresponding signals being transmitted over an analogue communication line (2 or 6). The demodulator 7, as in the diagram in FIG. 1, is intended for converting signals being transmitted over an analogue communication line (2 or 6) into samples of output discrete signal 9. An output of each modulator 1 is connected to an input of corresponding differential unit 10 which output is connected to an input of corresponding demodulator 7 in the same modem 21 or 27. Specific form of modulator I and demodulator 7 is determined by the form of employed modulation, as which could be used modulation types such as Quaternary Phase-Shift Keying (QPSK) or 16-ary Quadrature-Amplitude Modulation (16QAM) described, e.g., in the book by В.Л.Банкет, В. М. Дорофеев(V. L. Banket, V. M. Dorofeev). <<Цифровые методы в спутниковой связи(Digital methods in satellite communications).—Москва: Радиои связь(Moscow: Radio i sviaz). 1988, pp. 36-45 (in Russian). Particular embodiments of differential units 10, modulators 1 and demodulators 7 does not fall into the scope of patent claims in accordance with the present invention.

The first converter 23 comprises, besides the differential unit 10, also the unit 24 of forward conversion into PCM and the unit 42 of inverse conversion from PCM. The purpose of unit 24 of forward conversion into PCM corresponds to the purpose of the forward converter 3 in FIG. 1, and the purpose of unit 42 of inverse conversion from PCM corresponds to the purpose of the inverse converter 5 in FIG. 1. The second converter 25 comprises, besides the differential unit 10, also the unit 64 of forward conversion into PCM similar with the unit 24 in the first converter 23, and the unit 46 of inverse conversion from PCM similar to the unit 42 in the first converter 23. To the inputs of units 42 and 46, corresponding PCM signals come from the PCM channel 4. The output of each of units 42 and 46 of inverse conversion from PCM is connected to the input of the differential unit 10 in the corresponding converter 23 or 25, and the output of this differential unit 10 is connected to the input of corresponding unit 24 or 64 of forward conversion into PCM in the same converter 23 or 25. From the output of each of units 24 or 64 of forward conversion into PCM the PCM signals come to the PCM channel 4. Particular embodiments of units 24, 42, 46 and 64 are disclosed further in connection with FIG. 4.

Figure 3:
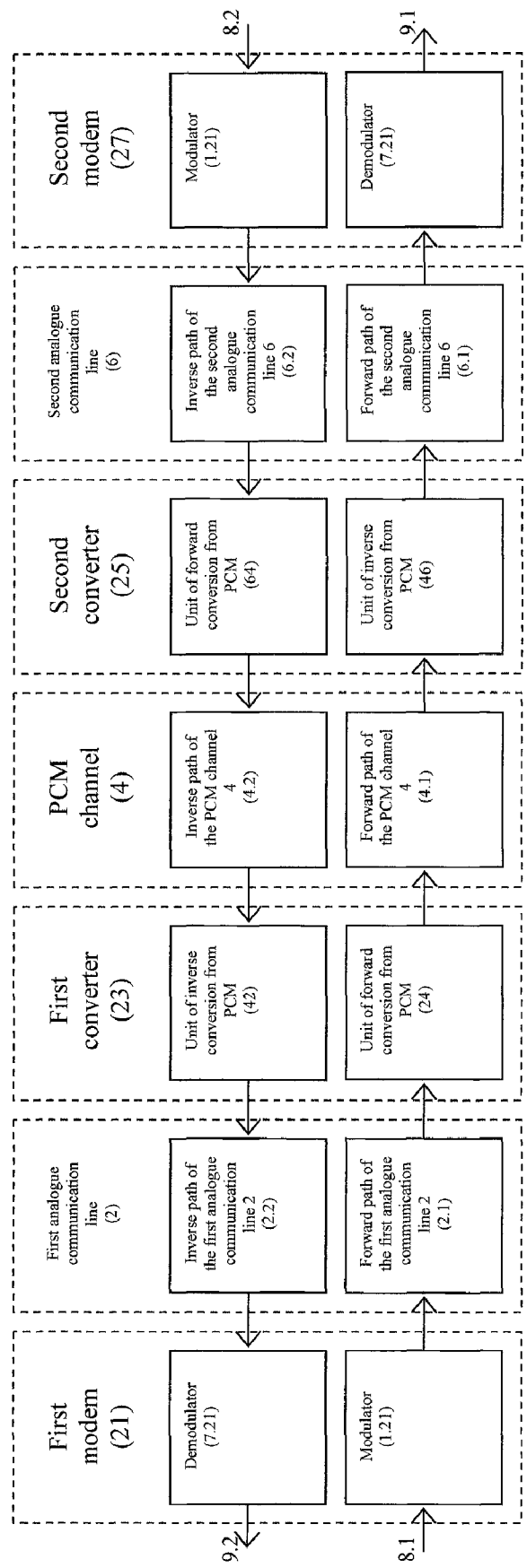
FIG. 3 illustrates the representation of the duplex communication path in the form of two virtual one-directional paths.

FIG. 3 explains the representation of duplex communication path in the form of two virtual one-directional paths. This diagram shows schematically two communication lines during operation of duplex (bidirectional) path in FIG. 2. In FIG. 3, unlike FIG. 2, each of analogue communication lines 2 and 6, and the PCM channel 4 are represented in the form of two units: respectively, 2.1 and 2.2, 4.1 and 4.2, 6.1 and 6.2, where digits after the point indicate the belonging of this unit to the first (forward) or second (inverse) paths. Such a representation of the duplex path in the form of two virtual one-directional paths carrying out the transmission in opposite directions shows obviously that, in the case of duplex transmission path, the doubling of communication path illustrated in FIG. 1 takes place. Therefore, taking into account that the signal transmission in opposite directions occurs in different (non-overlapping) frequency bands due to the differential units 10, each virtual one-directional path in FIG. 3 could be considered as operating just as the one-directional path in FIG. 1.

Figure 4:
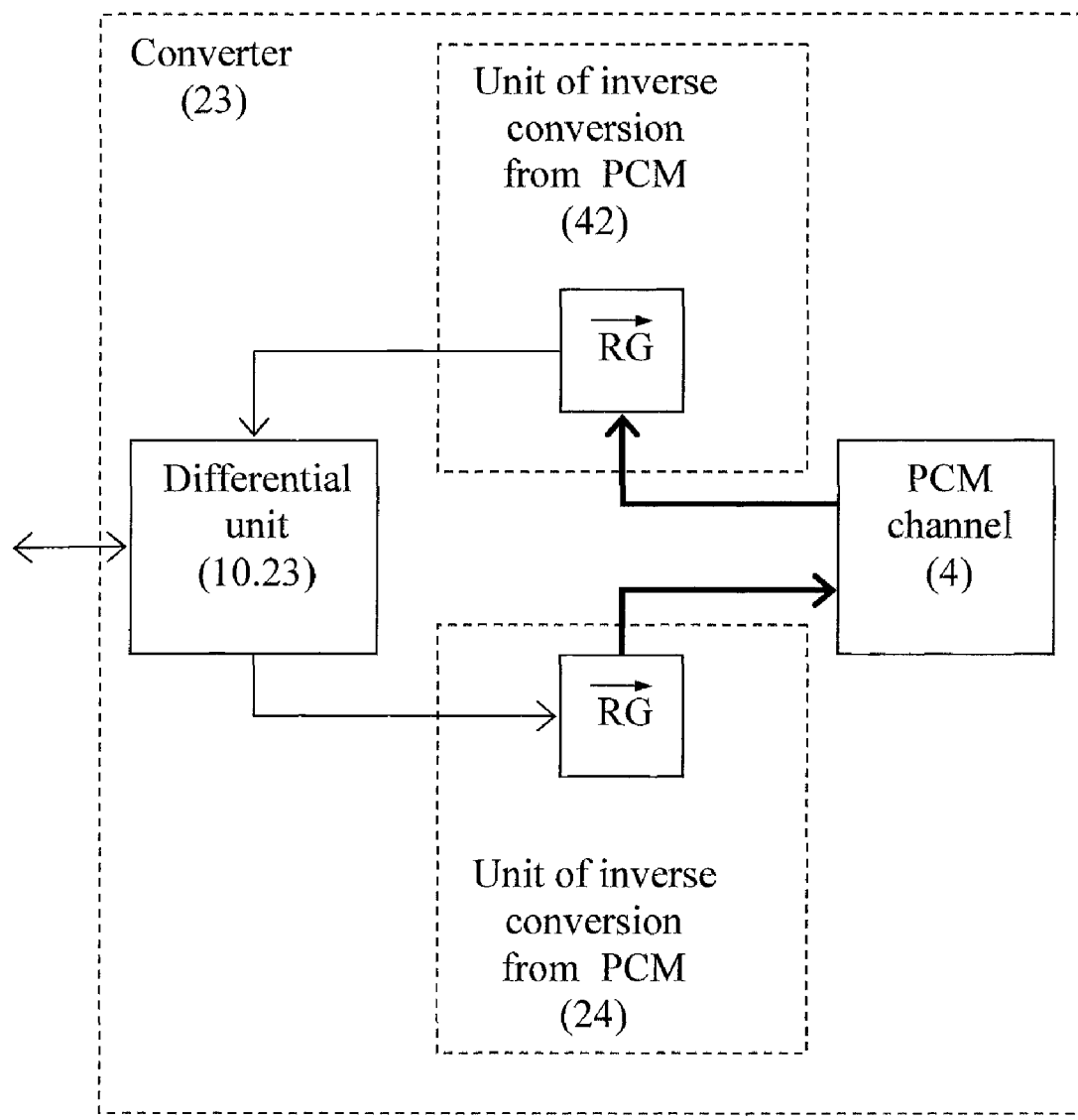
FIG. 4 represents the functional diagram of the converter having units of forward conversion into PCM and inverse conversion from PCM according to the present invention.

FIG. 4 shows the functional diagram of the first (for the sake of definiteness) converter 23 with the unit 24 of forward conversion into PCM and unit 42 of inverse conversion from PCM in accordance with the present invention. The embodiment of the second converter 25 is similar to the one shown in FIG. 4 with replacement of unit 24 by unit 64 and unit 42 by unit 46.

As shown in FIG. 4, the unit 24 of forward conversion into PCM is a shift register which serial input is connected to the output of differential unit 10.23 and parallel outputs are connected to the respective inputs of the PCM channel 4. The unit 42 of inverse conversion from PCM is also a shift register which parallel inputs are connected to the respective outputs of the PCM channel 4 and serial output is connected to the input of differential unit 10.23. it should be noted that problems of clocking and synchronization do not fall into the scope of patent claims in accordance with the present invention, since they are solved by any known methods (for example, described in the aforementioned book by V. L. Banket and V. M. Dorofeev).

The length of shift registers used as units 24 and 42 in the converter 23 (accordingly, 64 and 46 in the converter 25) is selected equal to a number of digits of the PCM signal. In the standard PCM systems, the PCM signal has 8 digits, therefore, the registers of units 24, 42, 46 and 64 have the length of 8 stages. However, if necessary, the length of these shift registers could be selected of any required amount.

In operation, the shift register of unit 24 receives the samples coming serially to its input from the communication line 2 (from the differential unit 10.23 in FIG. 2 or from line 2.1 in FIG. 3). Upon filling the shift register, the transmission of its content to the PCM channel 4 is carried out in parallel. Thus, the shift register of unit 24 performs, first, the serial-to-parallel conversion of samples coming from the communication line 2 into the PCM signals, and, second, the decrease of the sampling rate of the signal being transmitted. The shift register of unit 42 performs the inverse conversion, i.e., first, performs the parallel-to-serial conversion of the PCM signal into the signal for the analogue line, and, second, increase of the sampling rate of the signal being transmitted.

It should be noted that the distinction of the present invention from the known analogs is the corresponding interrelated selection of the spectrum of signal being transmitted over the analogue communication line and the ratio of sampling rates in the analogue communication line and PCM channel. As mentioned above, signals in analogue communications lines are subjected to the influence of interference. Therefore, it is desirable to ensure the transmission over an analogue communication line using such signals which interference immunity is maximal. This could be achieved when decreasing the number of quantization levels for samples being transmitted over an analogue communication line to the least possible. Note that digital signal can be transmitted over an analogue communication line when employing special modulation types, for example, QPSK or 16QAM, in which a continuous signal having a predetermined frequency and phase corresponds to every possible sample of digit signal. The number of those predetermined signals just determines the number of quantization levels for signal being transmitted over an analogue communication line. It is obviously that the least possible number of quantization levels is 2, when the transmission is carried out using the two-level (i.e., binary) signal. In this case, the difference between quantization levels is maximal, which ensures the best distinctivity of levels in a received signal even in the presence of interference.

Thus, it is expedient to select the number of quantization levels for the signal being transmitted over an analogue communication line equal to two. In this case, a spectrum of signal being transmitted over the analogue communication line should be selected such that the transfer rate of this signal over the analogue communication line is equal to the transfer rate of signals over the PCM channel. In so doing, it needs to select the same ratio of the sampling rates for the signals in the analogue communication line and in the PCM channel as the ratio of the number of quantization levels for the signals in the PCM channel and in the analogue communication line. For example, if the signal in the PCM channel has 8 binary digits, and the two-level signal is transmitted in the analogue communication line, then the sampling rate for the signal in the analogue communication line must be eight times greater as the sampling rate for the signal in the PCM channel. It is just such a case that is considered above in connection with the FIG. 4.

In so doing, it needs to select the spectrum of signal being transmitted over the analogue communication line such that the information transfer rate over this analogue communication line is equal the information transfer rate over the PCM channel. Taking into account that the transmission bandwidth of the PCM channel is 4 kHz, and the transfer rate for the 8-digit signal is 64 kbit/sec, the spectrum of the two-level signal being transmitted over the analogue communication line must be 32 kHz, then the information transfer rate over the analogue communication line is also 64 kbit/sec.

If it is necessary in the analogue communication line, for some reasons, to use a signal having more quantization levels, then it needs to alter accordingly the spectrum width of this signal and the mentioned ratio of sampling rates. The same should be done also in the case, when in the PCM channel is used the signal having not 8 levels, but another their number. In this case, the signal in the analogue communication line is not binary, therefore, the shift registers in the units 24, 42, 64 and 46 comprise non-binary stages, too. For example, if in the analogue communication line are used four-level signals, then the differential unit 10 ensures also the conversion of these signals into two-digit code words which are fed in this case as the samples from the analogue communication line to the serial inputs of the shift register in the unit 24 (FIG. 4). Each stage of the shift register, in its turn, is made for this case from the two-digit parallel register, and outputs of all two-digit stages are the parallel outputs of the shift register. In the case of 8-level signal in the PCM channel, the shift register of the unit 24 has 4 such two-digit stages. The shift register in the unit 42 has the same embodiment, but inputs of all two-digit stages serve as its parallel inputs, and outputs of the last two-digit stage serve as the serial output.

Thus, matching the spectrum of signal being transmitted over the analogue communication line (rather than the transmission bandwidth of this analogue communication line) with the transmission bandwidth of the PCM channel allows to increase the transfer rate of discrete information over a path comprising the analogue communication line along with the PCM channel up to the information transfer rate over this PCM channel. In so doing, the number of quantization levels for samples being transmitted over the analogue communication line is selected the least possible for this analogue communication line, and the sampling rate for this signal, under its conversion into the PCM channel signal, is decreased in proportion to the ratio of the number of quantization levels for the samples being transmitted over the PCM channel to the number of quantization levels for the samples being transmitted over the analogue communication line.

For the existing PCM channels, the information transfer rate is 64 kbit/sec, which corresponds to 4 kHz for the eight-digit signal. If the spectrum of two-level signal being transmitted over the analogue communication line is selected equal 32 kHz, then it follows from the Equation (1) that the signal-to-noise ratio, at which the information transfer rate of 64 kbit/sec is achieved, is 4.8 dB (in practice, it is 7-8 dB). Taking into account that the common telephone line (i.e., the analogue communication line) must have, in the norm, the signal-to-noise ratio not worse than 38-40 dB for the signal in the bandwidth from 300 to 3,400 Hz, then it follows that the expansion of the signal spectrum up to 32 kHz (i.e., approximately 10 times) allows to reduce said norm to 28-30 dB. Hence, the existing telephone communication lines, when employing them as the analogue communication lines of the "last mile", allow to ensure the capability of the path comprising such communication lines along with the PCM channel equal to the capability of this PCM channel.

INDUSTRIAL APPLICABILITY

This invention could be used in the communication field, when the information transfer path comprises at least an analogue communication line and PCM channel. In this case, the proposed method ensures the increase of the path capability up to the capability of the PCM channel irrespective of the quality of analogue communication line employed as the "last mile".

Although the present invention is described with reference to the specific example of its embodiment, this example does not limited the claimed patent scope which is defined by the following claims taking into account the use of possible equivalents.

The invention claimed is:

1. A method for transmitting discrete information over a communication path comprising at least an analogue communication line and a pulse-code modulation (PCM) channel in a direction of signal propagation, the method including the steps of:
    converting samples of a discrete signal to be transmitted into a form suitable for transmitting over the analogue communication line;
    utilizing a modulator to transmit the converted signal samples over the analogue communication line to the PCM channel;
    utilizing a forward converter to convert the signal received from the analogue communication line into a PCM channel signal; and
    transmitting the PCM channel signal over said PCM channel;

wherein in the step of transmitting the converted signal samples over the analogue communication line, a spectrum of the signal being transmitted over the analogue communication line is selected such that an information transfer rate over said analogue communication line is equal to an information transfer rate over the PCM channel, and the number of quantization levels for samples being transmitted over the analogue communication line is the least possible for this analogue communication line; and wherein in the step of converting the signal received from the analogue communication line into a PCM channel signal, the sampling rate of this signal is decreased proportionally to a ratio of the number of quantization levels for samples being transmitted over the PCM channel to the number of quantization levels for samples being transmitted over the analogue communication line.

2. The method according to claim 1, further comprising the step of performing an inverse conversion of the channel signals after their passing over the PCM channel in the presence of another analogue communication line after the PCM channel in the communication path in the direction of the signal propagation, which inverse conversion consists of decreasing the number of quantization levels for samples from the PCM channel to the least possible for said another analogue communication line, and in increasing proportionally the sampling rate in order to make the information transfer rate over said another analogue communication line equal to the information transfer rate over the PCM channel.

3. The method according to claim 1, wherein for the PCM channel having the information transfer rate of 64 kbit/sec and the transmission bandwidth of 4 kHz, the spectrum of the signal being transmitted over any analogue communication line is selected equal to 32 kHz, and the number of quantization levels for samples being transmitted over said any analogue communication line is selected as two.

4. The method according to claim 2, wherein for the PCM channel having the information transfer rate of 64 kbit/sec and the transmission bandwidth of 4 kHz, the spectrum of the signal being transmitted over any analogue communication line is selected equal to 32 kHz, and the number of quantization levels for samples being transmitted over said any analogue communication line is selected as two.

5. A system for transmitting discrete information, the system comprising: a modulator, an analogue communication line, a forward converter, and a pulse-code modulation (PCM) channel, all coupled in series, wherein a spectrum of a signal being transmitted over the analogue communication line is selected such that an information transfer rate over said analogue communication line is equal to an information transfer rate over the PCM channel;

wherein the modulator ensures a carder modulation in said analogue communication line with the least possible number of quantization levels for samples being transmitted over said analogue communication line; and wherein the forward converter performs a conversion of a signal received from the analogue communication line into a PCM channel signal while decreasing a sampling rate of the PCM channel signal proportionally to the ratio of a number of quantization levels for samples being transmitted over the PCM channel to a number of quantization levels for samples being transmitted over the analogue communication line.

6. The system according to claim 5, wherein an inverse converter, another analogue communication line and a demodulator, all coupled in series, are connected to an output of the PCM channel; wherein:

the inverse converter decreases the number of quantization levels for samples from the PCM channel to the least possible for said another analogue communication line, and increases proportionally the sampling rate in order to make the information transfer rate over said another analogue communication line equal to the information transfer rate over the PCM channel; and the demodulator performs demodulation of signals transmitted over said another analogue communication line into discrete samples.

7. The system according to claim 5, wherein for the PCM channel having the information transfer rate of 64 kbit/sec and the transmission bandwidth of 4 kHz, the spectrum of the signal being transmitted over any analogue communication line is 32 kHz, and the number of quantization levels for samples being transmitted over said any analogue communication line is two.

8. The system according to claim 6, wherein for the PCM channel having the information transfer rate of 64 kbit/sec and the transmission bandwidth of 4 kHz, the spectrum of the signal being transmitted over any analogue communication line is 32 kHz, and the number of quantization levels for samples being transmitted over said analogue communication line is two.

9. A method for duplex transmission of discrete information over a communication path comprising a bidirectional PCM channel, each end of which is coupled with a respective bidirectional analogue communication line, the method comprising the steps of:

converting samples of a discrete signal to be transmitted to a form suitable for transmitting over a bidirectional analogue communication line;

utilizing a first modem to transmit the converted signal samples over the analogue communication lines to the PCM channel;

utilizing a first converter to convert a signal received from the respective analogue communication lines into a PCM channel signal;

transmitting the PCM channel signal over said PCM channel;

utilizing a second converter to perform an inverse conversion of channel signals after their passing over the PCM channel;

transmitting the converted channel signals over another respective bidirectional analogue communication line; and identifying the signals transmitted over the another bidirectional analogue communication line and utilizing a second modem to convert those signals into discrete samples;

wherein in the step of transmitting the converted signal samples over the analogue communication lines, a spectrum of the signal being transmitted over each bidirectional analogue communication line is selected such that the information transfer rate over said bidirectional analogue communication line is equal to the information transfer rate over the PCM channel, and the number of quantization levels for samples being transmitted over the bidirectional analogue communication line is the least possible for this respective bidirectional analogue communication line;

wherein in the step of converting the signal received from the respective bidirectional analogue communication line into a PCM channel signal, the sampling rate of this signal is decreased proportionally to a ratio of the number of quantization levels for samples being transmitted over the PCM channel to the number of quantization levels for samples being transmitted over the bidirectional analogue communication line; and in the step of converting the channel signal received from the PCM channel into the signal for the bidirectional analogue communication line, the sampling rate of this signal is increased proportionally to said ratio.

10. The method according to claim 9, wherein for the bidirectional PCM channel having the information transfer rate of 64 kbit/sec and the transmission bandwidth of 4 kHz, the spectrum of the signal being transmitted over any bidirectional analogue communication line is selected equal to 32 kHz, and the number of quantization levels for samples being transmitted over the any bidirectional analogue communication line is selected as two.

11. A system for duplex transmission of discrete information, the system comprising:

a first modem, a first bidirectional analogue communication line, a first converter, a bidirectional pulse-code modulation (PCM) channel, a second converter, a second bidirectional analogue communication line, and a second modem, all coupled in series;

wherein the spectrum of the signal being transmitted over each bidirectional analogue communication line is selected such that the information transfer rate over said each bidirectional analogue communication line is equal to the information transfer rate over the bidirectional PCM channel;

wherein each modem ensures a carrier modulation in said each bidirectional analogue communication line with the least possible number of quantization levels for samples being transmitted over said each bidirectional analogue communication line, and ensures a demodulation of signals transmitted over said each bidirectional analogue communication line into discrete samples; and wherein each converter performs a conversion of a signal received from said each bidirectional analogue communication line into a PCM channel signal while decreasing a sampling rate of said PCM channel signal proportionally to the ratio of a number of quantization levels for samples being transmitted over the PCM channel to a number of quantization levels for samples being transmitted over said each bidirectional analogue communication line, and wherein each converter ensures a decrease of a number of quantization levels for samples from the PCM channel to the least possible number for said each bidirectional analogue communication line, and a proportional increase of a sampling rate in order to make the information transfer rate over said each bidirectional analogue communication line equal to the information transfer rate over the PCM channel.

12. The system according to claim 11, wherein for the bidirectional PCM channel having the information transfer rate of 64 kbit/sec and the transmission bandwidth of 4 kHz, the spectrum of the signal being transmitted over any bidirectional analogue communication line is 32 kHz, and the number of quantization levels for samples being transmitted over said any bidirectional analogue communication line is two.

13. The system according to claim 12, wherein each of the first and second converters comprises: a unit of forward conversion into a PCM, a unit of inverse conversion from PCM, and a differential unit, which combined input-output serves for receiving signals from the bidirectional analogue communication line and for transmitting signals to the bidirectional analogue communication line, wherein a separate output of the differential unit is connected to an input of the unit of forward conversion into PCM, which output serves for transmitting the PCM channel signal to the bidirectional PCM channel, and wherein a separate input of the differential unit is connected to an output of the unit of inverse conversion from PCM, which input serves for receiving the PCM channel signal from the bidirectional PCM channel.

14. The system according to claim 13, wherein the unit of forward conversion into PCM is made in the form of a shift register intended for sequential writing binary samples from the bidirectional analogue communication line with the sampling rate of this bidirectional analogue communication line, and for parallel reading of a content of this shift register with the sampling rate of the PCM channel, and wherein the unit of inverse conversion from PCM is made in the form of a shift register intended for parallel writing samples of the PCM channel signal with the sampling rate of the PCM channel, and for sequential reading binary samples from this shift register with the sampling rate of the bidirectional analogue communication line.

* * * * *